(12) United States Patent
Kaneko et al.

(10) Patent No.: US 10,407,109 B2
(45) Date of Patent: Sep. 10, 2019

(54) INSTRUMENT PANEL REINFORCEMENT AND MANUFACTURING METHOD FOR INSTRUMENT PANEL REINFORCEMENT

(71) Applicants: AISIN SEIKI KABUSHIKI KAISHA, Kariya-shi, Aichi-ken (JP); AISIN KEIKINZOKU KABUSHIKI KAISHA, Imizu-shi, Toyama-ken (JP)

(72) Inventors: Takanobu Kaneko, Nantong (CN); Yasuhisa Tsuchida, Nishio (JP); Kiyoichi Kita, Okazaki (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 0 days.

(21) Appl. No.: 15/697,647

(22) Filed: Sep. 7, 2017

(65) Prior Publication Data

US 2018/0072351 A1 Mar. 15, 2018

(30) Foreign Application Priority Data

Sep. 12, 2016 (JP) .................................. 2016-177876

(51) Int. Cl.
*B62D 25/14* (2006.01)
*B62D 21/15* (2006.01)

(52) U.S. Cl.
CPC .......... *B62D 25/145* (2013.01); *B62D 21/157* (2013.01)

(58) Field of Classification Search
CPC .................................................. B62D 25/145
USPC ........................... 296/193.02, 70, 72; 180/90
See application file for complete search history.

(56) References Cited

U.S. PATENT DOCUMENTS

| | | | | |
|---|---|---|---|---|
| 4,616,500 A | * | 10/1986 | Alexoff | B21C 37/16 72/276 |
| 4,722,216 A | * | 2/1988 | Fencl | B21C 37/16 72/370.04 |
| 6,394,527 B2 | * | 5/2002 | Ohno | B62D 25/08 296/193.02 |
| 7,407,221 B2 | * | 8/2008 | Kring | B62D 25/145 296/193.02 |
| 7,516,986 B2 | | 4/2009 | Kokubo | |

(Continued)

FOREIGN PATENT DOCUMENTS

| | | |
|---|---|---|
| JP | 2006-8112 | 1/2006 |
| JP | 2014-91421 | 5/2014 |
| JP | 2014-151684 | 8/2014 |

*Primary Examiner* — Gregory A Blankenship
(74) *Attorney, Agent, or Firm* — Finnegan, Henderson, Farabow, Garrett & Dunner, LLP

(57) ABSTRACT

An instrument panel reinforcement includes a large-diameter pipe portion, a diameter-changing pipe portion, which extends to one end side continuously and integrally from one end of the large-diameter pipe portion, and a small-diameter pipe portion, which extends to the one end side continuously and integrally from one end of the diameter-changing pipe portion. By performing a process of drawing a circular tube-shaped element tube to the one end side while reducing a diameter of the element tube by ironing more than once, the large-diameter pipe portion, the diameter-changing pipe portion, and the small-diameter pipe portion are formed integrally, thereby manufacturing the instrument panel reinforcement.

3 Claims, 4 Drawing Sheets

(56) References Cited

U.S. PATENT DOCUMENTS

| | | | | |
|---|---|---|---|---|
| 8,020,355 B2* | 9/2011 | Monteiro | ............. | B62D 25/145 |
| | | | | 29/447 |
| 8,220,857 B2* | 7/2012 | Baudart | ............... | B62D 25/145 |
| | | | | 296/193.02 |
| 8,312,629 B2* | 11/2012 | Hitz | .................... | B21C 37/0803 |
| | | | | 29/897.2 |
| 8,393,671 B2* | 3/2013 | Watanabe | ........... | B62D 25/147 |
| | | | | 296/193.02 |
| 8,876,194 B2* | 11/2014 | Dix | ...................... | B62D 25/088 |
| | | | | 296/187.09 |
| 8,939,497 B2* | 1/2015 | Baudart | ............... | B62D 25/147 |
| | | | | 296/193.02 |
| 8,950,778 B2* | 2/2015 | Fukushima | .......... | B62D 25/145 |
| | | | | 280/779 |
| 8,979,176 B2* | 3/2015 | Atsumi | ............... | B62D 25/145 |
| | | | | 296/193.02 |
| 9,446,800 B2* | 9/2016 | Davos | .................. | B62D 29/001 |
| 2009/0152898 A1* | 6/2009 | Kawamura | ........... | F16L 13/147 |
| | | | | 296/193.02 |
| 2014/0125086 A1* | 5/2014 | Da Costa Pito | ..... | B62D 25/145 |
| | | | | 296/72 |

\* cited by examiner

INSTRUMENT PANEL REINFORCEMENT AND MANUFACTURING METHOD FOR INSTRUMENT PANEL REINFORCEMENT

INCORPORATION BY REFERENCE

The disclosure of Japanese Patent Application No. 2016-177876 filed on Sep. 12, 2016 including the specification, drawings and abstract is incorporated herein by reference in its entirety.

BACKGROUND

1. Technical Field

The disclosure relates to an instrument panel reinforcement and a manufacturing method for the instrument panel reinforcement.

2. Description of Related Art

A reinforcement extending in a vehicle width direction has usually been provided inside an instrument panel of a vehicle. This instrument panel reinforcement has a function of reinforcing a vehicle body against, for example, a side collision, and also has a function of supporting various onboard parts. Therefore, the reinforcement on the driver's seat side, which supports relatively heavy onboard parts such as a steering device, is made thicker so as to ensure rigidity. Meanwhile, the reinforcement on the front passenger seat side is made thinner so as to reduce the entire weight.

As such an instrument panel reinforcement, for example, Japanese Patent Application Publication No. 2014-91421 (JP 2014-91421 A) discloses one that is provided with a large-diameter metal pipe on the driver's seat side and a small-diameter metal pipe provided on the front passenger seat side. The metal pipe on the front passenger seat side is fitted to and connected with one end part of the metal pipe on the driver's seat side where a diameter is reduced. In this instrument panel reinforcement, a roller is pressed against a connecting part of the metal pipe on the driver's seat side and the metal pipe on the front passenger seat side so that a rolling groove is formed. Thus, the metal pipes are joined to one another. Compared to a case where the metal pipes are joined to each other by, for example, welding, it is possible to restrain material quality from changing because of heat.

SUMMARY

Incidentally, it has been required in recent years to make a vehicle structure even simpler. However, in the structure described in the foregoing JP 2014-91421 A, two metal pipes having different diameters are necessary as parts that construct the instrument panel reinforcement. Therefore, it has been required to create a technology for realizing even more simplified structure.

An object of the disclosure is to provide an instrument panel reinforcement having a simple structure and a manufacturing method for the instrument panel reinforcement.

An instrument panel reinforcement for solving the foregoing problems includes a tube-shaped large-diameter pipe portion, a tube-shaped diameter-changing pipe portion, which extends continuously and integrally from one end of the large-diameter pipe portion and has an outer diameter that is reduced towards one end side, and a tube-shaped small-diameter pipe portion, which extends continuously and integrally from one end of the diameter-changing pipe portion and has a smaller outer diameter than that of the large-diameter pipe portion.

According to the above structure, the large-diameter pipe portion, the diameter-changing pipe portion, and the small-diameter pipe portion are formed integrally. Therefore, compared to a case where two tubes having different diameters are connected with each other, it is possible to reduce the number of parts, thereby simplifying the structure.

In the above-mentioned instrument panel reinforcement, a thickness of the small-diameter pipe portion may be set to be smaller than a thickness of the large-diameter pipe portion. According to this structure, it is possible to ensure strength of the large-diameter pipe portion so as to support onboard parts in a stable manner. Meanwhile, the thickness of the small-diameter pipe portion is reduced, thereby achieving a further reduction of the entire weight.

The instrument panel reinforcement may further include a second diameter-changing pipe portion, which extends continuously and integrally from one end of the small-diameter pipe portion and has an outer diameter that increases towards the one end side, and a second large-diameter pipe portion, which extends continuously and integrally from one end of the second diameter-changing pipe portion and has an outer diameter that is set to be equal to that of the large-diameter pipe portion.

According to the above aspect, since the outer diameters of both ends of the instrument panel reinforcement become equal to each other, it is possible to use common brackets for attaching the instrument panel reinforcement to a vehicle body. A manufacturing method for the instrument panel reinforcement, which solves the foregoing problems, includes integrally forming the large-diameter pipe portion, the diameter-changing pipe portion, which extends continuously and integrally from one end of the large-diameter pipe portion and has an outer diameter that is reduced towards one end side, and the small-diameter pipe portion, which extends continuously and integrally from one end of the diameter-changing pipe portion and has a smaller outer diameter than that of the large-diameter pipe portion, by extending an element tube to the one end side of the element tube while reducing a diameter of the element tube by ironing.

According to the above structure, by ironing the element tube, the large-diameter pipe portion, the diameter-changing pipe portion, and the small-diameter pipe portion are formed integrally, thereby manufacturing the instrument panel reinforcement. Thus, it is possible to easily and accurately position the large-diameter pipe portion, the diameter-changing pipe portion, and the small-diameter pipe portion so that they are coaxial with each other.

In the manufacturing method for the foregoing instrument panel reinforcement, the outer diameter of the element tube may be larger than the outer diameter of the large-diameter pipe portion, and may be equal to the outer diameter of the large-diameter pipe portion. In the aspect where the outer diameter of the element tube is equal to the outer diameter of large-diameter pipe portion, since the outer diameter of the element tube is equal to the outer diameter of the large-diameter pipe portion, it is possible to simplify labor for processing the large-diameter pipe portion, thereby manufacturing the instrument panel reinforcement easily.

According to the disclosure, it is possible to simplify the structure of the instrument panel reinforcement.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a first embodiment of an instrument panel reinforcement and a manufacturing method for the instrument panel reinforcement is explained with reference to the drawings.

Figure 1:
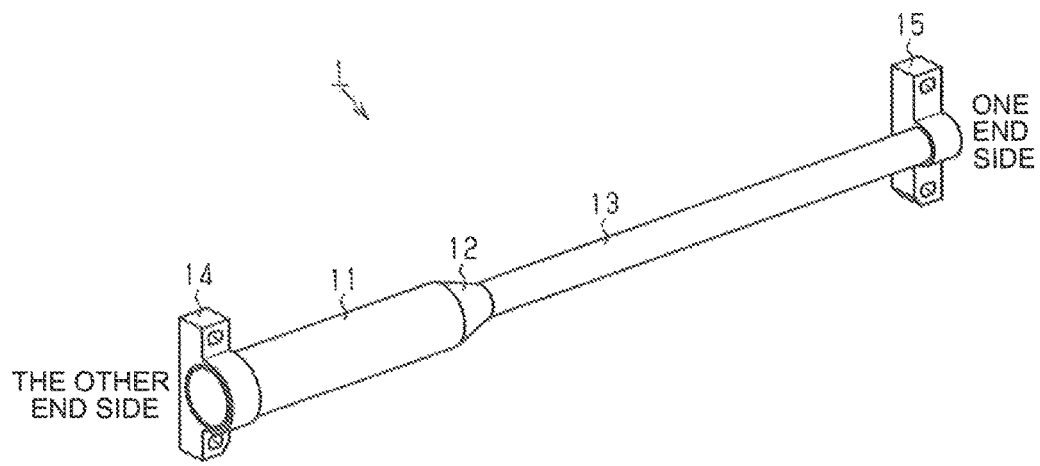
FIG. 1 is a perspective view of an instrument panel reinforcement according to the first embodiment, in a state where bracket are assembled.

An instrument panel reinforcement 1 shown in FIG. 1 is provided inside an instrument panel of a vehicle. The instrument panel reinforcement not only reinforces a vehicle body against, for example, a side collision, but also supports onboard parts such as a steering device. In the explanation below, the right side in the drawings is regarded as one end side of the instrument panel reinforcement 1, and the left side is regarded as the other end side of the instrument panel reinforcement 1.

Figure 2:
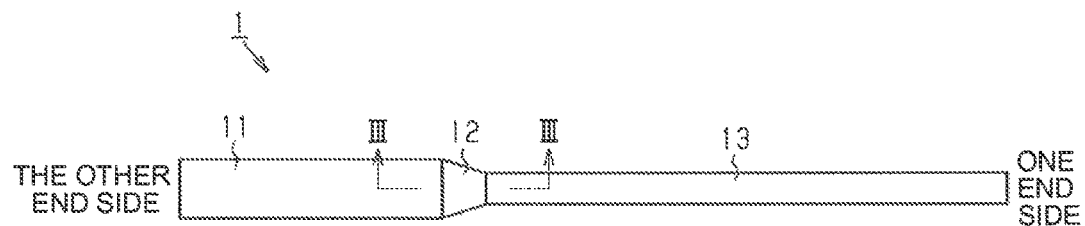
FIG. 2 is a side view of the instrument panel reinforcement according to the first embodiment.

As shown in FIG. 1 and FIG. 2, the instrument panel reinforcement 1 is made of a metallic material such as aluminum alloy, and formed into a long and narrow tube shape as a whole. To be more specific, the instrument panel reinforcement 1 is provided with a large-diameter pipe portion 11, a diameter-changing pipe portion 12 extending to the one end side continuously and integrally from one end of the large-diameter pipe portion 11, and a small-diameter pipe portion 13 extending to the one end side continuously and integrally from one end of the diameter-changing pipe portion 12. The large-diameter pipe portion 11 is formed into a tube shape having an annular section, and has an outer diameter and an inner diameter that are generally constant throughout its entire region in the longitudinal direction. The diameter-changing pipe portion 12 is formed into a short tube shape having an annular section, and also formed into a tapered shape in which an outer diameter and an inner diameter of the diameter-changing pipe portion 12 are reduced linearly at a certain angle towards the one end side, in other words, as a distance from the large-diameter pipe portion 11 increases. The small-diameter pipe portion 13 is formed into a tube shape that has an annular section and is longer than the large-diameter pipe portion 11. The small-diameter pipe portion 13 has an outer diameter and an inner diameter that are generally constant throughout the entire region in the longitudinal direction. The outer diameter and the inner diameter of the small-diameter pipe portion 13 are set to be smaller than the outer diameter and the inner diameter of the large-diameter pipe portion 11, respectively.

Figure 3:
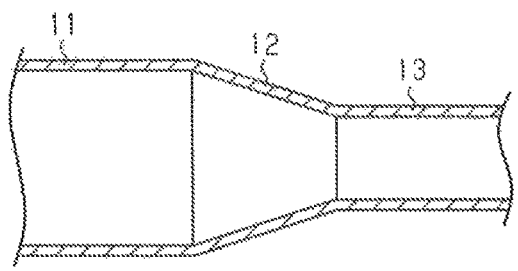
FIG. 3 is a partial sectional view of the instrument panel reinforcement according to the first embodiment, taken along the line III-III in FIG. 2.

As shown in FIG. 3, in the embodiment, thicknesses of the large-diameter pipe portion 11, the diameter-changing pipe portion 12, and the small-diameter pipe portion 13 are generally the same, and each of the thicknesses is set to be generally constant throughout the entire region in the longitude direction. The large-diameter pipe portion 11, the diameter-changing pipe portion 12, and the small-diameter pipe portion 13 are formed into a seamless integrated part.

As shown in FIG. 1, brackets 14, 15 are fitted to both ends of the instrument panel reinforcement 1 and fixed by welding or the like, respectively. In the instrument panel reinforcement 1, the large-diameter pipe portion 11 is provided with brackets and so on for supporting onboard parts such as a steering device (not shown), and the small-diameter pipe portion 13 is provided with brackets and so on for supporting onboard parts such as an airbag (not shown).

Figure 4:
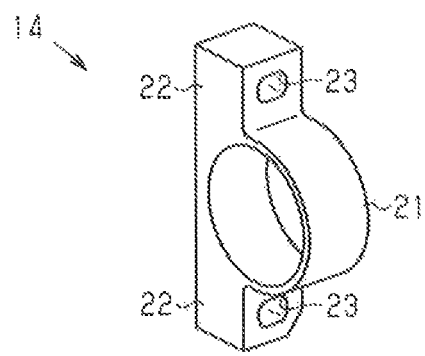
FIG. 4 is a perspective view of a large-diameter bracket.

As shown in FIG. 4, the large-diameter bracket 14 includes an annular large-diameter fitting portion 21 and a pair of flange portions 22 projecting in a radial direction of the large-diameter fitting portion 21. An inner diameter of the large-diameter fitting portion 21 is set to be generally equal to the outer diameter of the large-diameter pipe portion 11. In each of the flange portions 22, a through-hole 23 is formed, which goes through the flange portion 22 in a direction orthogonal to the axis of the large-diameter fitting portion 21.

Figure 5:
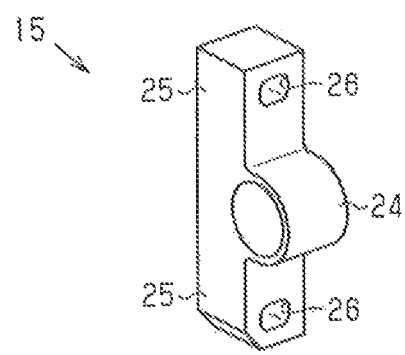
FIG. 5 is a perspective view of a small-diameter bracket.

As shown in FIG. 5, the small-diameter bracket 15 includes an annular small-diameter fitting portion 24 and a pair of flange portions 25 projecting in a radial direction of the small-diameter fitting portion 24. An inner diameter of the small-diameter fitting portion 24 is set to be generally equal to the outer diameter of the small-diameter pipe portion 13. In each of the flange portions 25, a through-hole 26 is formed, which goes through the flange portion 25 in a direction orthogonal to the axis of the small-diameter fitting portion 24. Then, the instrument panel reinforcement 1 is assembled to a vehicle body by using fastening members (not shown) such as bolts that are inserted into the through-holes 23, 26 of the brackets 14, 15, respectively, in a state where the large-diameter pipe portion 11 is arranged on the driver's seat side and the small-diameter pipe portion 13 is arranged on the front passenger seat side.

Figure 6:
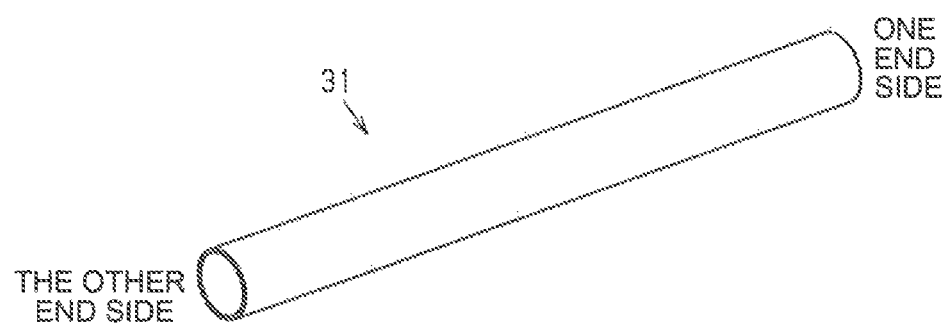
FIG. 6 is a perspective view of an element tube.

Next, a manufacturing method for the instrument panel reinforcement is explained. The instrument panel reinforcement 1 is manufactured as follows. While reducing a diameter of an element tube 31 having a circular pipe shape as shown in FIG. 6 by ironing, a process of drawing the element tube 31 towards the one end side is carried out more than once. Thus, the large-diameter pipe portion 11, the diameter-changing pipe portion 12, and the small-diameter pipe portion 13 are formed as an integrated body, thereby manufacturing the instrument panel reinforcement 1. An outer diameter of the element tube 31 according to the embodiment is set to be generally equal to the outer diameter of the large-diameter pipe portion 11. A length of the element tube 31 is set to be longer than the entire length of the large-diameter pipe portion 11, and smaller than the entire length of the instrument panel reinforcement 1 by a given length. The given length is an extended length of the element tube 31 due to the diameter reduction for forming the diameter-changing pipe portion 12 and the small-diameter pipe portion 13 by ironing the element tube 31. The given length is obtained in advance based on experiments and so on.

Figure 7A:
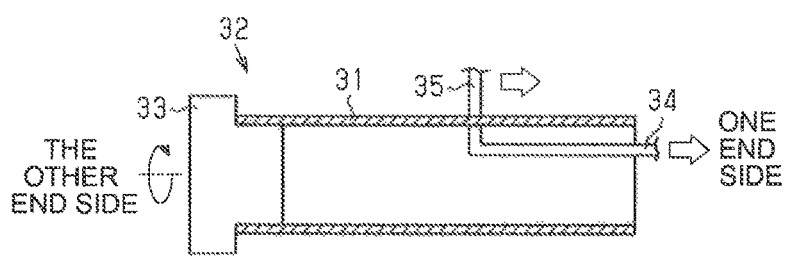
FIG. 7A to FIG. 7C are schematic views of manufacturing processes for the instrument panel reinforcement.

Specifically, as shown in FIG. 7A, the other end part of the element tube 31 is fixed to a columnar support portion 33 of a processing device 32, and rotated at given rotation speed. Next, an inner peripheral side tool 34, whose distal end is bent into an L shape, is inserted in an inner periphery of the element tube 31 from the one end side, and, at the same time, an outer peripheral side tool 35 is pressed against a position corresponding to the distal end of the inner peripheral side tool 34, from the outer peripheral side of the element tube 31. Then, the inner peripheral side tool 34 and the outer peripheral side tool 35 first sandwich a position of the element tube 31 corresponding to the other end of the diameter-changing pipe portion 12, and then the inner peripheral side tool 34 and the outer peripheral side tool 35 are moved towards the one end side while reducing the diameter of the element tube 31 by a given amount that does not apply excessive stress on the element tube 31.

Figure 7B:
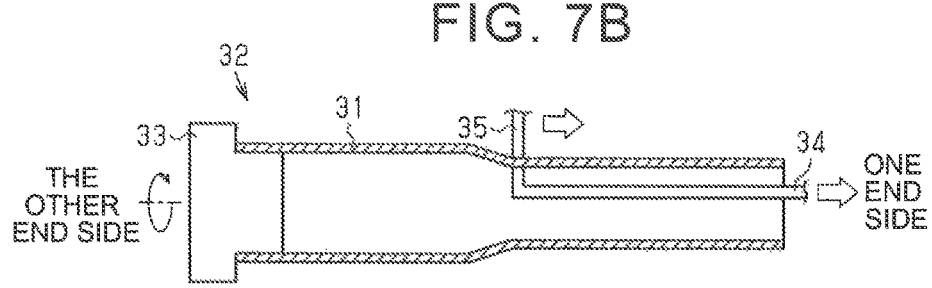
Figure 7C:
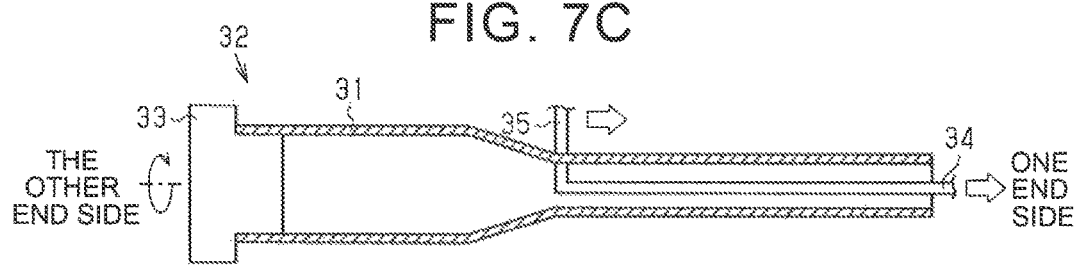

Next, the inner peripheral side tool 34 and the outer peripheral side tool 35 sandwich a position that is slightly closer to the one end side compared to the position where the processing started in the previous process, and the inner peripheral side tool 34 and the outer peripheral side tool 35 are moved towards the one end side while reducing the diameter of the element tube 31 in the similar manner. By repeating this kind of processing, the diameter of the element tube 31 is reduced gradually as shown in FIG. 7B and FIG. 7C. By performing the processing until the diameter of the one end part of the element tube 31 becomes equal to the outer diameter of the small-diameter pipe portion 13, the instrument panel reinforcement 1 is manufactured.

As described so far, according to the embodiment, the following effects are obtained. Since the instrument panel reinforcement 1 is a seamless integrated part that includes the large-diameter pipe portion 11, the diameter-changing pipe portion 12, and the small-diameter pipe portion 13, it is possible to reduce the number of parts and the structure is simplified compared to a case where a plurality of tubes having different diameters are connected with each other.

Since the instrument panel reinforcement 1 is manufactured by integrally forming the large-diameter pipe portion 11, the diameter-changing pipe portion 12, and the small-diameter pipe portion 13 by ironing the element tube 31, it is possible to easily and accurately position axes of the large-diameter pipe portion 11, the diameter-changing pipe portion 12, and the small-diameter pipe portion 13 coaxially. Further, compared to a case where a plurality of tubes is joined to each other by welding and so on, it is possible to restrain material quality from changing.

Since the element tube 31 used has the same outer diameter as that of the large-diameter pipe portion 11, it is possible to simplify a labor for processing the large-diameter pipe portion 11, and it is thus possible to manufacture the instrument panel reinforcement 1 easily.

Next, a second embodiment of an instrument panel reinforcement and a manufacturing method for the instrument panel reinforcement is explained with reference to the drawings. For convenience of explanation, the same reference numerals as those of the foregoing first embodiment are used for the same components, and the explanation of such components is omitted.

Figure 8:
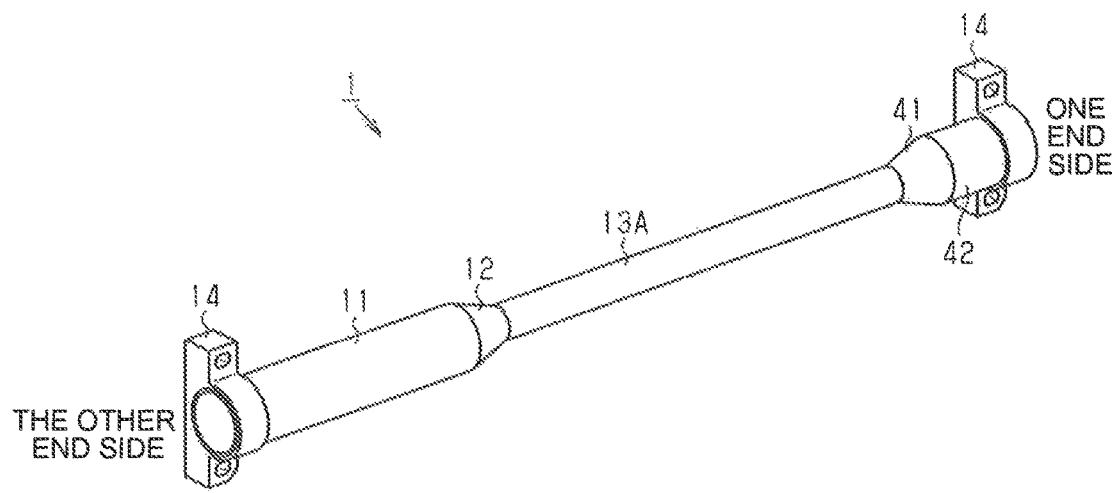
FIG. 8 is a perspective view of an instrument panel reinforcement according to the second embodiment.

As shown in FIG. 8, an instrument panel reinforcement 1 according to this embodiment includes a large-diameter pipe portion 11, a diameter-changing pipe portion 12, a small-diameter pipe portion 13A, which is shorter than the small-diameter pipe portion 13 of the first embodiment, a second diameter-changing pipe portion 41 extending continuously and integrally from one end of the small-diameter pipe portion 13A, and a second large-diameter pipe portion 42 extending continuously and integrally from one end of the second diameter-changing pipe portion 41. The second diameter-changing pipe portion 41 is formed into a short tube shape having an annular section, and is also formed into a tapered shape in which an outer diameter and an inner diameter linearly increases at a given angle towards the one end side, in other words, as a distance from the small-diameter pipe portion 13A increases. The second large-diameter pipe portion 42 is formed into a tube shape having an annular sectional shape that has an outer diameter and an inner diameter equal to the outer diameter and the inner diameter of the large-diameter pipe portion 11, respectively, throughout the entire region in the longitudinal direction.

Large-diameter brackets 14 are fitted and fixed to both ends of the instrument panel reinforcement 1, respectively. Then, the instrument panel reinforcement 1 is attached to a vehicle body by fastening members that are inserted into through-holes 23 of the large-diameter brackets 14, respectively, in a state where the large-diameter pipe portion 11 is arranged on the driver's seat side and the small-diameter pipe portion 13A is arranged on the front passenger seat side.

Similarly to the foregoing first embodiment, in the manufacturing method for the instrument panel reinforcement 1, processing for drawing an element tube 31 to the one end side while reducing a diameter of the element tube 31 is carried out more than once. Thus, the large-diameter pipe portion 11, the diameter-changing pipe portion 12, the small-diameter pipe portion 13A, the second diameter-changing pipe portion 41, and the second large-diameter pipe portion 42 are integrally formed, thereby manufacturing the instrument panel reinforcement 1.

Next, effects of this embodiment are described. In this embodiment, the following effects are obtained in addition to those of the foregoing first embodiment. The instrument panel reinforcement 1 is provided with the second diameter-changing pipe portion 41 extending continuously and integrally from one end of the small-diameter pipe portion 13A, and the second large-diameter pipe portion 42 that extends continuously and integrally from one end of the second diameter-changing pipe portion 41 and has the outer diameter that is set to be equal to that of the large-diameter pipe portion 11. Therefore, outer diameters of both ends of the instrument panel reinforcement 1 become equal to each other, and it is thus possible to fix the large-diameter brackets 14 having the same shape to the both ends. Because of this, it becomes possible to use common brackets for attaching the instrument panel reinforcement 1 to a vehicle body.

Figure 9:
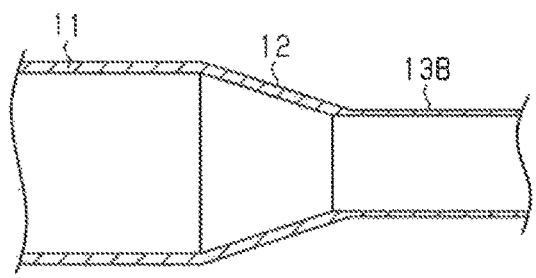
FIG. 9 is a partial sectional view of an instrument panel reinforcement according to another example.

The above embodiments may be carried out in the following aspect where changes are appropriately made in the above embodiments. In the foregoing first embodiment, the thicknesses of the large-diameter pipe portion 11, the diameter-changing pipe portion 12, and the small-diameter pipe portion 13 are generally the same. However, the disclosure is not limited to this, and the thicknesses of the large-diameter pipe portion 11, the diameter-changing pipe portion 12, and the small-diameter pipe portion 13 may be different from each other. For example, as shown in FIG. 9, the thicknesses of the large-diameter pipe portion 11 and the diameter-changing pipe portion 12 are set to be generally the same, and the thickness of a small-diameter pipe portion 13B may be set to be about a half of the thickness of the large-diameter pipe portion 11 and the diameter-changing pipe portion 12. Thus, it is possible to ensure strength of the large-diameter pipe portion 11 and support relatively heavy onboard parts such as a steering device in a stable manner. At the same time, by reducing the thickness of the small-diameter pipe portion 13B, it is also possible to reduce the entire weight. Similarly, in the foregoing second embodiment, the thicknesses of the large-diameter pipe portion 11, the diameter-changing pipe portion 12, the small-diameter pipe portion 13A, the second diameter-changing pipe portion 41, and the second large-diameter pipe portion 42 may be different from each other. For example, the thickness of the small-diameter pipe portion 13A may be set to be about a half of the thickness of the large-diameter pipe portion 11 and the diameter-changing pipe portion 12.

In the foregoing first embodiment, the brackets 14, 15 are fitted to both ends of the instrument panel reinforcement 1, and the instrument panel reinforcement 1 is attached to a vehicle body through the brackets 14, 15. However, the disclosure is not limited to this, and, for example, both ends of the instrument panel reinforcement 1 may be formed into a flat plate shape by pressing or the like, and through-holes may be formed. Then, fastening members may be inserted in the through-holes, thereby attaching the instrument panel reinforcement 1 to the vehicle body. Similarly, in the foregoing second embodiment, the instrument panel reinforcement 1 may be attached to a vehicle body without using the large-diameter bracket 14.

In each of the foregoing embodiments, the diameter-changing pipe portion 12 is formed into the tapered shape in which the outer diameter and the inner diameter are reduced linearly at a certain angle towards the one end side. However, the disclosure is not limited to this, and the diameter-changing pipe portion 12 may have a tapered shape in which, for example, the outer diameter and the inner diameter are reduced in curve towards the one end side. Further, the second diameter-changing pipe portion 41 of the foregoing second embodiment may have, for example, a tapered shape in which the outer diameter and the inner diameter are increased in curve towards the one end side.

In the foregoing embodiments, as the element tube 31 that serves as a material for the instrument panel reinforcement 1, a tube having the same outer diameter as that of the large-diameter pipe portion 11 is used. However, the element tube 31 is not limited to this, and may be an element tube having a larger outer diameter than that of the large-diameter pipe portion 11.

What is claimed is:

1. A manufacturing method for an instrument panel reinforcement, the instrument panel reinforcement including a tube-shaped large-diameter pipe portion, a tube-shaped diameter-changing pipe portion, which extends continuously and integrally from one end of the large-diameter pipe portion and has an outer diameter that is reduced towards one end side, and a tube-shaped small-diameter pipe portion, which extends continuously and integrally from one end of the diameter-changing pipe portion, and has a smaller outer diameter than that of the large-diameter pipe portion, the manufacturing method for the instrument panel reinforcement comprising
   integrally forming the large-diameter pipe portion, the diameter-changing pipe portion, and the small-diameter pipe portion by extending an element tube to the one end side of the element tube while reducing a diameter of the element tube by ironing with a first side tool being inserted in an inner periphery of the element tube from the one end side and a second side tool being pressed against a position corresponding to the first side tool.

2. The manufacturing method for the instrument panel reinforcement according to claim 1, wherein an outer diameter of the element tube is equal to the outer diameter of the large-diameter pipe portion.

3. The manufacturing method for the instrument panel reinforcement according to claim 1, wherein:
   the first side tool has a distal end protruding toward the inner peripheral of the element tube; and
   the position corresponding to the first side tool is a position corresponding to the distal end.

* * * * *